United States Patent [19]
Cohen et al.

[11] 3,730,352
[45] May 1, 1973

[54] FILTRATION APPARATUS

[75] Inventors: Stanley N. Cohen, Menlo Park, Calif.; Myron Tannenbaum, East Brunswick, N.J.

[73] Assignee: New Brunswick Scientific Co., Inc., New Brunswick, N.J.

[22] Filed: Dec. 6, 1971

[21] Appl. No.: 205,776

[52] U.S. Cl. ................................210/332, 210/406
[51] Int. Cl. ..............................................B01d 29/04
[58] Field of Search......................210/323, 332, 406, 210/409

[56] References Cited
UNITED STATES PATENTS
3,319,792   5/1967   Leder et al. .......................210/406 X

*Primary Examiner*—Frank A. Spear, Jr.
*Attorney*—Alex Friedman et al.

[57] ABSTRACT

A filtration apparatus for simultaneously performing a plurality of filtering operations. A plurality of filters are respectively situated beneath a plurality of reservoir cavities for supplying liquid to be filtered to the filters to pass therethrough, and a plurality of collection vials are respectively situated beneath the filters for receiving the filtrate therefrom. The entire apparatus can be inverted as a unit. A plurality of seals respectively seal the reservoir cavities with respect to the filters in such a way that during the washing operations washing liquid can wash the margins of the filters.

9 Claims, 8 Drawing Figures

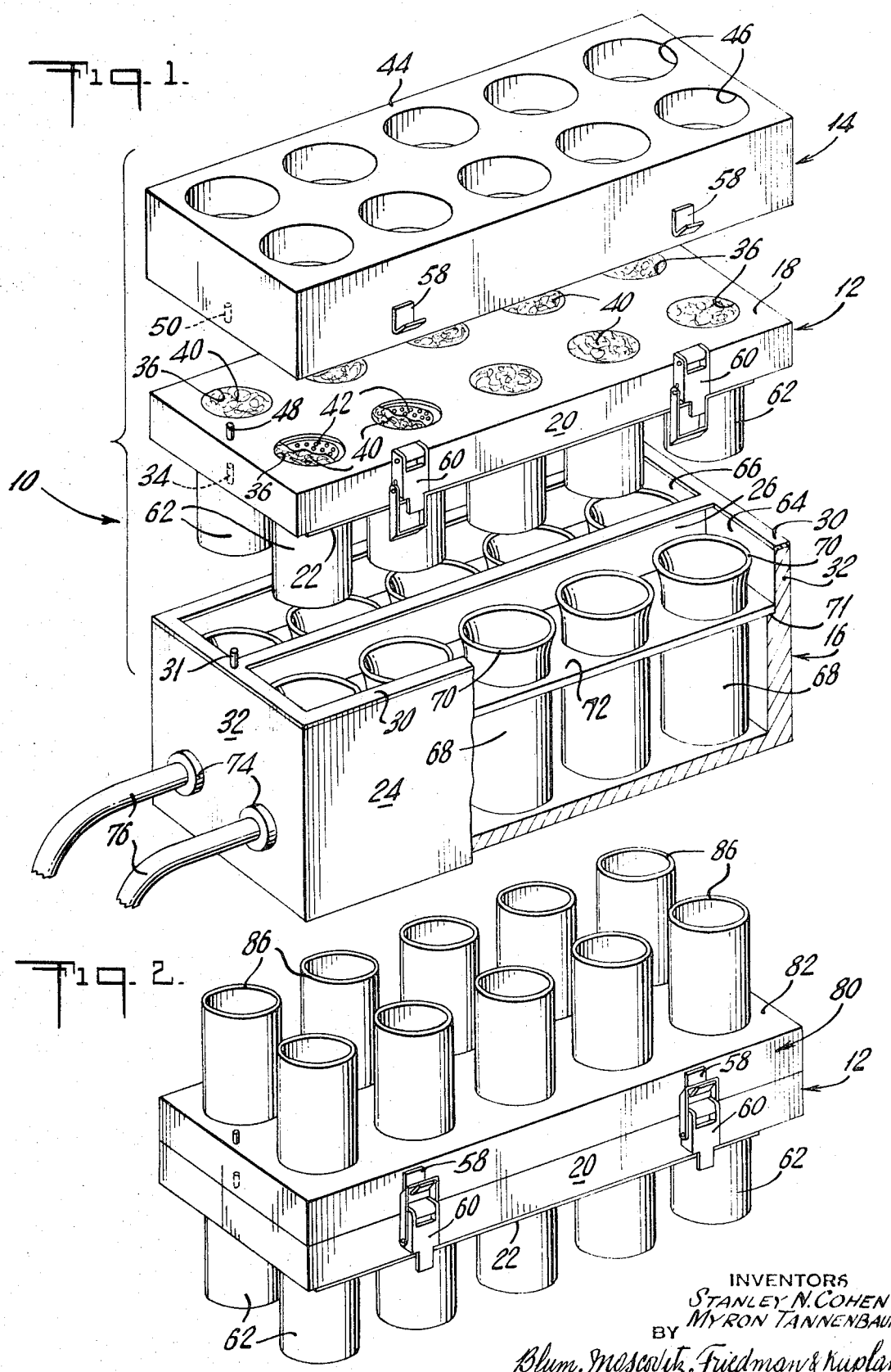

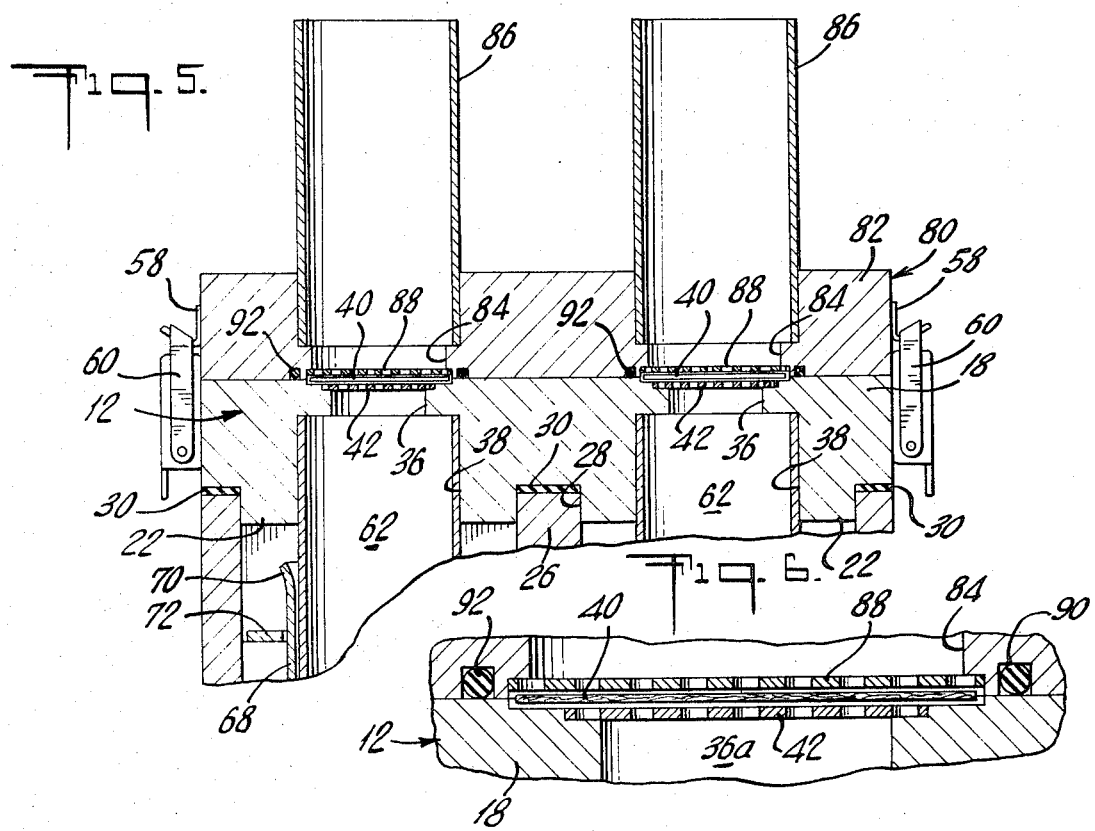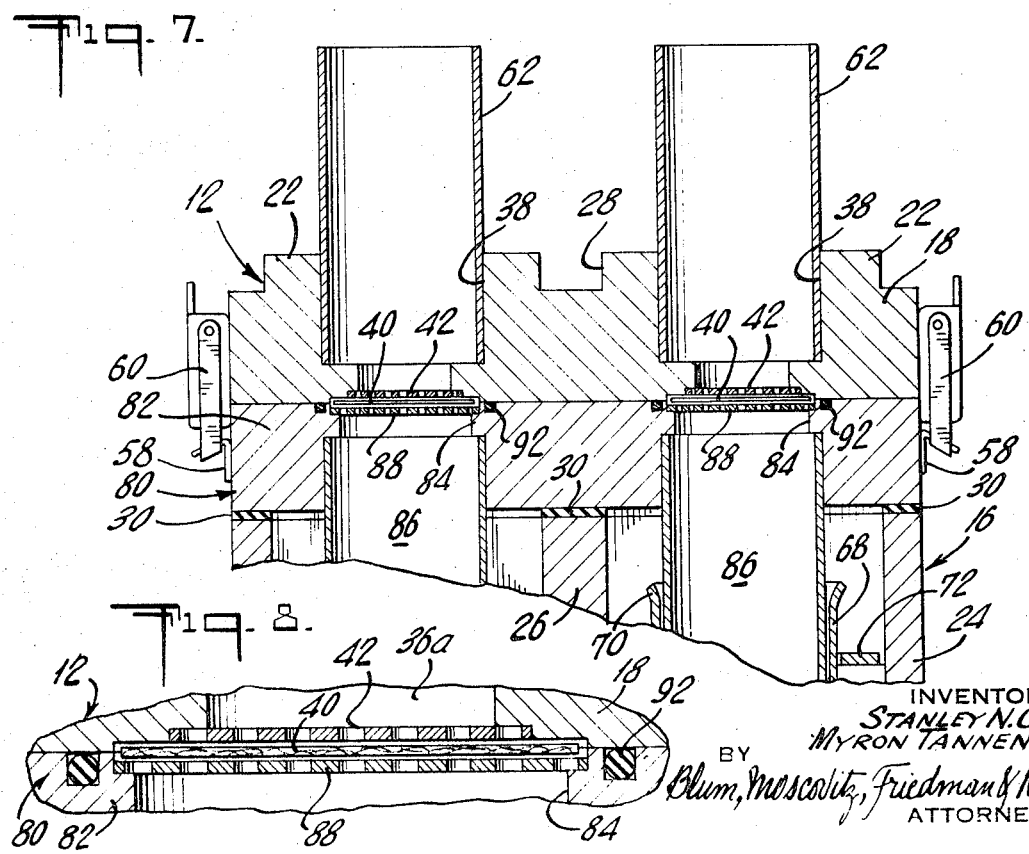

FILTRATION APPARATUS

BACKGROUND OF THE INVENTION

The present invention relates to filters.

In particular, the present invention relates to a filtration apparatus which is capable of simultaneously performing a plurality of filtering operations.

While there are known filtration apparatus for simultaneously performing a plurality of filtering operations, the known apparatus has serious drawbacks. Thus, previously known filtration apparatus require individual handling of separate filters, resulting not only in inconvenience but also in damage of fragile filters unless great care is exercised.

Also, with known filter apparatus, it is conventional to place sealing elements in engagements with the periphery of a filter. As a result, during washing operations it is not possible to wash the margin.

Furthermore, with known structures, although simultaneous filtering operations can be performed, it is nevertheless necessary to carry out individual operations with the separate filtering units. For example, it is necessary to handle individual sample reservoirs for the separate filtering units, and these operations represent a considerable inconvenience.

A further disadvantage encountered with conventional apparatus resides in the fact that the materials used are subject to attack by certain materials so that care must be exercised to use with conventional apparatus only those materials which will not deleteriously effect the filtration apparatus.

SUMMARY OF THE INVENTION

It is accordingly a primary object of the present invention to provide a filtration apparatus which will avoid the above drawbacks.

In particular, it is an object of the present invention to provide a filtration apparatus which enables complete washing of the filters to be carried out, with the washing liquid having access to all parts of each filter including the margin thereof.

It is also an object of the invention to provide a filtration apparatus which can be inverted as one unit.

It is furthermore an object of the present invention to use for a filtration apparatus substances which have high resistance to most acids as well as alkalies and solutions of high salt concentration.

It is furthermore an object of the present invention to provide a filtration apparatus which will eliminate such inconveniences as individual handling of sample reservoirs.

An additional object of the present invention is to provide a filtration apparatus which is capable of reliably protecting individual filters, particularly during washing operations, so that the filters will not become damaged due to repeated handling.

Yet another object of the present invention is to provide a filtration apparatus which enables a plurality of washing or back-washing operations to be simultaneously carried out in a highly convenient manner.

Furthermore, it is an object of the present invention to provide a filtration apparatus which will enable washing operations to be carried out in such a way that washing solutions are not required only to pass through the filters but instead can also flow around the edges of the filters.

According to the invention the filtration apparatus includes a plurality of filters and a carrier means carrying the plurality of filters and formed with openings covered by the filters which respectively have areas greater than the openings. A reservoir means is situated over the carrier means and formed with a plurality of reservoir cavities which respectively communicate with the filters for directing respectively thereto liquids located in the reservoir cavities. A collection means is situated beneath the carrier means for positioning beneath the filters collection vials in which filtrates are respectively collected beneath the several filters, respectively. A plurality of sealing means are situated between the carrier means and reservoir means for sealing the several filters and the reservoir cavities respectively situated thereover from each other in such a way that liquid passing through one filter cannot reach any other filter, thus assuring that the liquid in any one reservoir cavity will flow only through the filter therebeneath into a single collection vial. A washing means is interchangeable with the reservoir means to be positioned in place of the latter over the carrier means, this washing means being formed with cavities which respectively communicate with the filters for directing washing liquid therethrough. A plurality of sealing means are carried by the reservoir means, and a plurality of additional sealing means are carried by the washing means for sealing the filters with respect to the cavities of the washing means to prevent washing liquid in one cavity of the washing means from reaching any filters except that which is beneath the one cavity of the washing means. The washing means and carrier means coact with washing of the filters over their entire areas, including the margins thereof.

BRIEF DESCRIPTION OF DRAWINGS

The invention is illustrated by way of example in the accompanying drawings which form part of this application and in which:

FIG. 1 is an exploded perspective illustration of a filtration apparatus according to the invention;

FIG. 2 is a perspective illustration showing a washing means which has replaced a reservoir means of FIG. 1, this washing means being shown in FIG. 2 connected with a carrier means which carries the filters;

FIG. 5 is a transverse sectional elevation of the structure of FIG. 2 shown mounted on a collection means;

FIG. 6 is a fragmentary sectional elevation of part of the structure of FIG. 5 at the region of a filter for illustrating in greater detail the cooperation between the components at the region of each filter;

FIG. 7 is a fragmentary sectional elevation showing components of FIG. 5 in an inverted position to carry out back-washing operations; and FIG. 8 is a fragmentary sectional view, at an enlarged scale as compared to FIG. 7, showing one of the filters of FIG. 7 and the components associated therewith.

DESCRIPTION OF A PREFERRED EMBODIMENT

Referring to FIG. 1, the filtration apparatus 10 of the invention which is illustrated therein includes a carrier means 12 situated between a reservoir means 14, which is situated over the carrier means 12, and a collection means 16 which is situated beneath the carrier means 12. The several means 12, 14 and 16 may be made from a suitable plastic and may be transparent.

Figure 3:
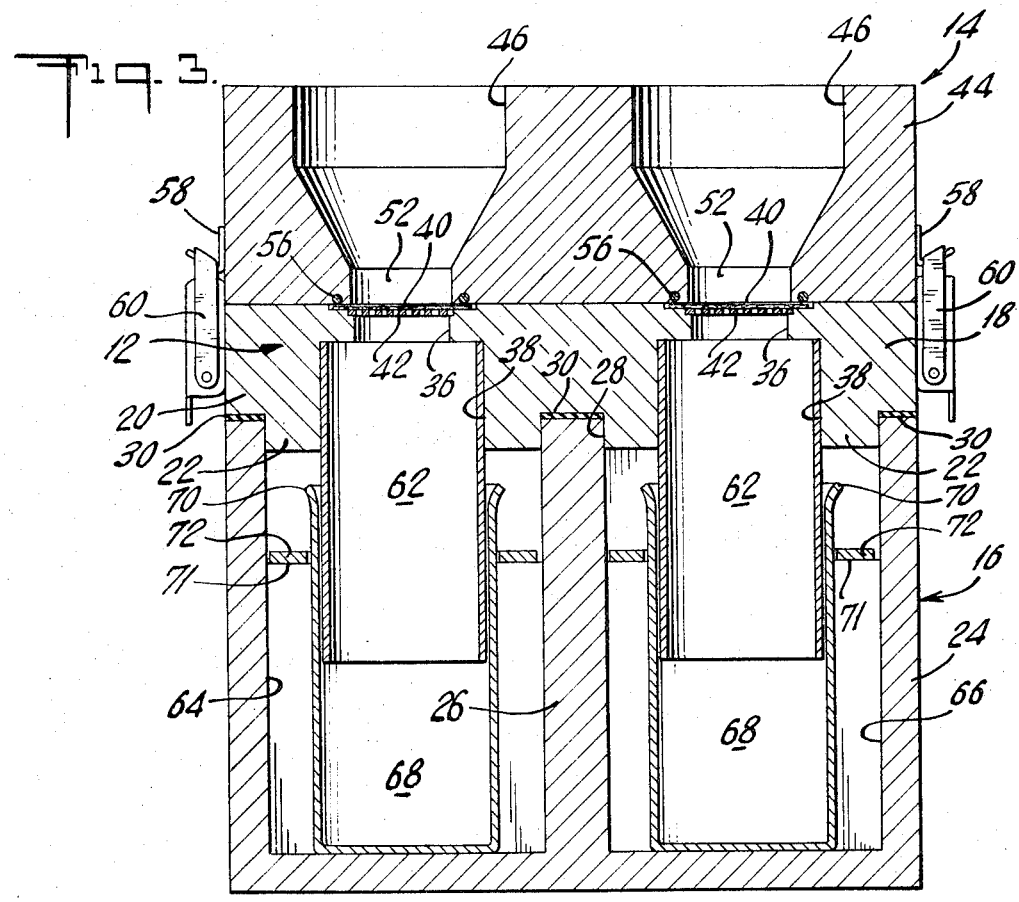
FIG. 3 is a transverse sectional elevation of the structure of FIG. 1 illustrating all of the components in their assembled condition.

As is particularly apparent from FIGS. 1 and 3, the carrier means 12 is in the form of an elongated block 18 which has at its lower region, inwardly of its outer exposed peripheral surface 20, a downwardly extending region 22 adapted to be received within the collection means 16.

The collection means 16 includes an outer hollow enclosure 24 of elongated rectangular configuration, and the outer peripheral surface of the downwardly extending portion 22 of the block 18 of the carrier means 12 slidably engages the inner surface of the enclosure 24 at the upper region thereof with a fairly close fit, as is apparent from FIG. 3. The hollow interior of the enclosure 24 is divided into a plurality of chambers by a partition means 26. In the illustrated example this partition means 26 takes the form of a single intermediate wall situated equidistantly between and extending parallel to the opposed side walls of the enclosure 24 and extending to the same height as the side walls of the enclosure 24. The downwardly extending portion 22 of the block 18 is formed with a lower central elongated groove 28 which receives the upper region of the partition 26. The opposed ends of the downwardly extending portion 22 are also situated inwardly of the outer surface 20 of the block 18 and these opposed ends also slidably engage the inner surfaces of the end walls of the enclosure 24. The upper surface of the enclosure 24 carries a gasket 30 which covers the entire upper surface of the enclosure 24 so as to provide a seal between the enclosure means 16 and the carrier means 12 when the latter rests on the enclosure means 16 in the manner indicated in FIG. 3. The groove 28 by its coaction with the partition 26 serves also to properly align the carrier means 12 with respect to the enclosure means 16. In order that there may be extremely precise alignment there is also a dowel pin 31 (FIG. 1) fixed to and extending upwardly from the end 32 of the enclosure 24, through a suitable opening in the gasket 30, and this dowel 31 is adapted to be received in a cooperating bore 34 in the block 18. In this manner the partition 26 together with the groove 28 and the dowel 31 together with the bore 34 achieve a precise location of the carrier means 12 on the collection means 16.

Figure 4:
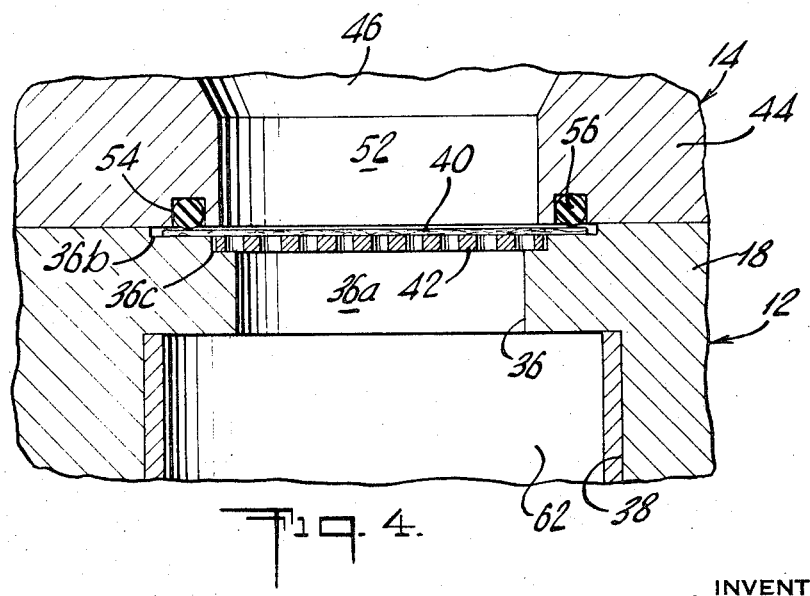
FIG. 4 is an enlarged fragmentary sectional elevation showing part of the structure of FIG. 3 where a filter is located at an enlarged scale, as compared to FIG. 3, for illustrating more clearly details of the present invention.

The block 18 of the carrier means 12 is formed with a plurality of openings 36 passing therethrough. As is shown most clearly in FIG. 4, each opening 36 is of a stepped configuration having a lower portion 36a which has the smallest diameter of the opening 36, an upper portion 36b which is relatively shallow and has the largest diameter of the opening 36, and an intermediate portion 36c which provides a step between the portion 36b and the portion 36a of each opening 36. Each opening 36 extends upwardly from the top end of a coaxial cylindrical bore 38 which is formed in the block 18 extending upwardly from the bottom surface thereof for a purpose referred to below.

In the example illustrated in the drawings, the block 18 of the carrier means 12 is formed with ten openings 36 arranged in two parallel rows each of which has five of these openings, and within each of these openings, resting at its outer periphery at the portion 36b thereof is a filter 40. Thus, in the illustrated example the carrier means 12 serves to carry ten filters 40 which are of circular configuration and have an outer periphery greater than the diameter of the portion 36c of each opening but smaller than the diameter of the portion 36b thereof.

The filtration apparatus which is illustrated in the drawings is capable of meeting a variety of research applications including DNA-RNA and DNA-DNA hybridization, quantitive and rapid collection of bacteria and precipitates, and protein DNA binding studies.

For such applications the filter 40 is in the form of a membrane of nitrocellulose, glass fiber, or other types of membranes, and the particular filters used may be 24 mm or 25 mm filters in the example illustrated. The membrane filters 40 each have a thickness on the order of 0.005 inch.

In order to contribute to the support of the filters, the carrier means 18 carries in each of its openings 36 a corrosion-resistant circular screen 42 which rests on the shoulder formed by the intermediate bore portion 36c, the diameter of the corrosion-resistant screen 42 being such as to provide for the corrosion-resistant screen 42 a fairly tight fit in the bore portion 36c. Therefore, even if the block 18 is inverted from the position shown in FIG. 4 the screen 42 will remain in the position illustrated with respect to the block 18, for a purpose referred to below.

With the filtration apparatus of the invention the several filters 40 are retained on the corrosion-resistant screens 42 so as to carry out a rapid, continuous and complete filtration of precipitates.

The reservoir means 14 is also in the form of a block of suitable plastic material, and all of the plastic materials used for all of the components may be transparent. The block 44 which forms the reservoir means 14 is formed with a plurality of reservoir cavities 46. These cavities 46 extend completely through the block 44 and are also arranged in two rows each of which has five cavities 46 as is apparent from FIG. 1. A dowel 48 affixed to the top surface of the carrier means 12 is received in a bore 50 of the block 44 for the purpose of precisely determining the location of the reservoir means 14 with respect to the carrier means 12. In this way the several reservoir cavities 46 will be coaxially aligned with the several openings 36 of the carrier means 12.

Each cavity 46 is provided with a bottom outlet end region 52 surrounded at the lower surface of reservoir means 14, which engages the upper surface of carrier means 12, with an annular groove 54 in which a sealing means 56 is accommodated. This sealing means 56 takes the form of an O-ring of a suitable elastic material which becomes pressed against the outer peripheral region of the filter 40 when the parts are assembled in the position illustrated in FIGS. 3 and 4.

For the purpose of tightly holding the reservoir means 14 with its bottom surface pressing against the top surface of the carrier means 12, the reservoir means 14 carries at each of its outer side surfaces a pair of hooks 58, while each outer side surface of the carrier means 12 carries a pair of toggle clamps 60 capable of engaging the hooks 58 in the manner shown in FIG. 3 for tightly holding the reservoir means 14 and the carrier means 12 assembled together.

In this way the several sealing means 56 are compressed against the upper peripheral surface regions of the several filters 40. As a result any liquid in any one reservoir cavity 46 is compelled to flow only through the filter 40 therebeneath and it is not possible for the liquid in any one cavity 46 to reach a filter beneath any other cavity 46. This is one of the important features of the invention inasmuch as in this way cross-contamination is avoided and it becomes possible to carry on simultaneously a plurality of filter operations even though the different operations deal with different materials.

As was pointed out above, the block 18 is formed in coaxial alignment with the several openings 36 with a plurality of downwardly extending cylindrical bores 38 all of which respectively communicate with the openings 36. These openings 38 serve to receive the upper ends of elongated guide tubes 62 in the form of simple elongated hollow cylinders of circular cross-section which have opposed open ends. Thus, one row of five guide tubes 62 extend down into the hollow interior of the enclosure 24 of the collection means on one side of the partition 26, and the remaining row of five guide tubes 62 extend downwardly into the hollow interior of the enclosure 24 on he other side of the partition 26. Thus, the partition 26 serves to divide the hollow interior of the collection means 16 into a pair of entirely separate chambers 64 and 66.

Within each of these chambers there is a row of five collection vials 68. The several collection vials 68 have outwardly flaring upper peripheries 70 for facilitating entry of the guide tubes 62 respectively into the several collection vials 68 in the manner shown most clearly in FIG. 3.

The end walls 32 of the enclosure 24 are provided at their inner surfaces with upwardly directed shoulders 70, one of which is apparent at the lower right of FIG. 1, and these shoulders 70 in each of the chambers 64 and 66 serve to support the ends of an elongated rack 72. Thus, a pair of racks 72 are respectively situated in the chambers 64 and 66. Each rack 72 is in the form of a plate formed with a row of circular openings through which the vials 68 extend freely, so that in this way the rack 72 serves to position the several vials 72 with respect to each other in each of the chambers 64 and 66, and thus when the parts are assembled the several guide tubes 62 will reliably extend into the several vials 68, respectively, thus assuring that all of the filtrates from all of the several filtering operations which may be going forward simultaneously are respectively received only in separate vials 68 of the collection means 16 without any possibility of cross-contamination.

The left end wall 32 which is shown in FIG. 1 carries a pair of connecting means 74 which respectively extend through this end wall 32 into communication with the pair of chambers 64 and 66, respectively, and this pair of connecting means 74 serves to connect the pair of chambers through tubes 76, for example, with any suitable source of suction such as a source of vacuum or a water-aspirator, the tubes 76 being in the form of suitable hoses, for example.

In this way it is possible for the chambers of the collection means to be evacuated for further assuring the tightness at the gasket 30 so as to have a desired seal between the collection means 16 and the carrier means 12, and also the hollow interiors of the chambers 64 and 66 will be at pressure less than atmospheric pressure. In addition, the pressure reduction expedites pulling of liquid through the filters.

Thus, it becomes possible with the apparatus described above to carry out filtration simultaneously at a plurality of filters with all of the filtering operations going forward entirely independently of each other. The different filtrates are collected in the several vials 68 which may, for example, be 70 cc vials.

The provision of a single block 44 to form the reservoir means 14 with the reservoir cavities 46 directly formed therein avoids handling of sample reservoirs so that a rapid and efficient loading can be achieved with great convenience, and the 10-cavity loading block 44 can be rapidly set in place and removed as a single unit. The funnel-shaped configuration of the reservoir cavities 46 greatly facilitate the filling of these cavities each of which may have a volume on the order of 20 cc. The several tubes 62 serve to direct the several filtrates into the several collection vials 68, respectively. It will be noted that the above-described structure, and the sealing means formed by the O-rings, in particular, assure a complete isolation of each sample and each filtrate, preventing leakage of liquids.

The reservoir means 14 is interchangeable with a washing means 80 shown in FIGS. 2 and 5. The washing means 80 also is in the form of a block 82 of a suitable plastic formed with two rows of five openings each adapted to be respectively coaxially aligned with the several filters 40. Thus, as is apparent from FIG. 5, each of these openings 84 of the washing means 80 has a lower portion situated directly over a filter and an upper portion of a somewhat larger diameter which receives an end of an elongated tube 86. The several tubes 86 are fixed to the block 80 and they are identical with the guide tubes 62.

The lower end region of each opening 84 is enlarged to receive with a fairly tight fit a corrosion-resistant screen 88 which may be made of the same material as the screen 42 but which is of a larger diameter, as is apparent from FIGS. 5 and 6. Moreover, the lower surface of the washing means 88, which directly engages the upper surface of the carrier means 12, is formed around and adjacent each opening 84 with an annular groove 90 which receives an O-ring 92 which forms a sealing means pressed against the upper surface of the carrier means 12 when the washing means 80 is assembled therewith in the manner shown in FIGS. 5 and 6. As is apparent from FIGS. 2 and 5, the block 82 fixedly carries at its opposed side surfaces hooks 58 to coact with the toggle-clamps 60 of the carrier means 12, so that in this way the washing means 80 may be releasably connected with the carrier means 12 in the same way as the reservoir means 14, and the O-rings 92 are thus compressed against the top surface of the carrier means 12.

When the washing operations are carried out the carrier means 12 is situated on the collection means 16 in precisely the same way as when filter operations are carried out. However, in this case suitable washing solutions are placed in the tubes 86 to flow through the several filters into the collection vials.

As is most clearly shown in FIG. 6, the distance between the parallel screens 42 and 88 is somewhat greater than the thickness of the filter 40. For example, where the filter 40 has a thickness on the order of 0.005 inch as pointed out above, the clearance between the screens 42 and 88 may be on the order of 0.010 inch. Thus, each filter is in a captive condition between the screens 42 and 88 during the washing operations, but at the same time each filter is capable of floating between the screens 42 and 88, so that the washing liquid not only can pass through a filter but also can wash around the peripheral edge thereof.

The several washing solutions will thus be collected in the several vials, and in this case also the several sealing means formed by the O-rings 92 will reliably prevent leakage of liquid.

In the event that it is desired to carry out back-washing operations, then the interconnected carrier means and washing means, held together by the toggle-clamps 60, are simply raised and inverted to assume the position shown in FIGS. 7 and 8. Therefore in this position the guide tubes 62 are directed upwardly while the tubes 86 are directed downwardly into the several collection vials, and now solutions for carrying out back-washing operations are directed downwardly through the screens 42, the filters 40, and the screens 88, and it will be noted that in this case also the captive filters are capable of floating between the screens while the sealing means 92 still seals the several washing operations from each other, so that through these seals leakage of liquid is prevented regardless of the direction of flow. Thus, the tubes 62 and 86 are in fact dual-purpose tubes serving in one position as reservoirs for washing solutions and in the other position as guides for liquids into the collection vials. Thus, for protein-nucleic acid-binding assays, the washing solution may be collected in individual vials, with reliable prevention of different solutions from mixing with each other.

The corrosion-resistant screens 42 and 88 may be made of perforated stainless steel plates, for example. The plastic used for substantially the entire filtration apparatus of the invention is preferably an inert acrylic plastic and has a resistance to most acids, including perchloric acid and trichloroacetic acid, as well as to alkalis and solutions of high salt concentration.

When the washing operations are going forward, the filter and washing assemblies can be repeatedly inverted while they remain clamped together, between the positions shown on the one hand in FIGS. 5 and 6 and on the other hand in FIGS. 7 and 8. Thus it is possible to wash both sides of the filters.

Moreover, any desired number of filtering and washing operations, up toten or less in the illustrated example can take place simultaneously, and in the event that five or less operations are required, it is necessary to use only one side of the apparatus because of the arrangement of the filtering and washing assemblies in two rows of five each with the collection means separated by the partition 26 into the pair of individual chambers 64 and 66 only one of which may be used in the event that five or less operations are required to be carried out simultaneously. When all ten filter and washer assemblies are used, then both chambers are connected to a source of suction. If all five assemblies on one side of the partition are used, then only the one chamber on the one side of the partition need be connected to a source of suction. However, if less than five assemblies on one side of the partition are used, then the assemblies which are not used on this same side of the partition will of course be plugged so as to prevent air from being drawn in to the interior of the suction chamber through the non-used assemblies. Naturally if the operations are carried out without suction any desired number of the assemblies can be used without the requirement of plugging non-used assemblies.

What is claimed is:

1. In a filtration apparatus, a plurality of filters, carrier means carrying said filters, said carrier means being formed with openings passing therethrough and said openings being respectively covered by said filters, the latter having areas which are respectively greater than the areas of said openings, reservoir means situated over said carrier means and formed with a plurality of reservoir cavities respectively situated over and communicating with said plurality of filters for containing liquids directed from said cavities through said filters, respectively, collection means situated beneath said carrier means for positioning respectively beneath said filters collection vials for receiving filtrates which have passed through said filters, a plurality of sealing means situated between said carrier means and reservoir means and forming between the reservoir cavities and the filters respectively situated therebeneath a plurality of seals which prevent liquid in any one reservoir cavity from reaching a filter or vial situated beneath any other reservoir cavity so that a plurality of filtering operations may be carried on simultaneously without cross-contamination, and washing means interchangeable with said reservoir means to be positioned in place of the latter over said carrier means, said washing means being formed with cavities respectively communicating with said filters for directing washing liquid therethrough, said plurality of sealing means being carried by said reservoir means and a plurality of additional sealing means carried by said washing means for sealing said filters with respect to said cavities of said washing means to prevent washing liquid in one cavity of said washing means from reaching any filter except that which is beneath said one cavity of said washing means, said washing means and carrier means coacting to provide for washing of the filters over their entire areas, including the margins thereof.

2. The combination of claim 1 and wherein said carrier means carries a plurality of screens respectively situated beneath said filters while said washing means carries a plurality of screens respectively situated over said filters at lower outlet ends of the cavities of said washing means, and the clearance between the screens of said washing means and the screens of said carrier means, respectively, being greater than the thickness of said filters to that each filter can float between a pair of screens during filter-washing operations.

3. The combination of claim 2 and wherein said plurality of sealing means carried by said washing means are situated outwardly beyond and surround said screens of said washing means.

4. The combination of claim 3 and wherein a connecting means is releasably connected with said washing means and carrier means for releasably connecting them to each other for inversion as a common unit to a back-washing position.

5. The combination of claim 1 and wherein said carrier means has an upper surface and said reservoir means has a lower surface engaging said upper surface, said cavities respectively having bottom outlet ends situated directly over said filters and said sealing means being carried by said reservoir means at said lower surface thereof and being in the form of a plurality of sealing rings respectively surrounding said bottom outlet ends of said cavities and directly engaging said filters at outer peripheral regions thereof.

6. The combination of claim 1 and wherein said carrier means carries a plurality of tubes respectively extending downwardly from said filters for directing filtrate into said vials, respectively.

7. The combination of claim 1 and wherein said collection means is in the form of hollow enclosure carrying in its interior a partition means dividing the interior of said enclosure into a plurality of chambers with each of which some of said filters communicate, so that one or more of said chambers can be utilized depending upon the number of filtering operations which are required.

8. The combination of claim 7 and wherein a plurality of connection means respectively communicate with said chambers for connecting the latter to sources of suction.

9. The combination of claim 8 and wherein said carrier means has a lower surface formed with a groove for receiving upper edge regions of said partition means which position said carrier means with respect to said collection means.

* * * * *